June 20, 1939.  D. F. HYLAND  2,162,916
ORTHOPEDIC
Filed Oct. 7, 1935
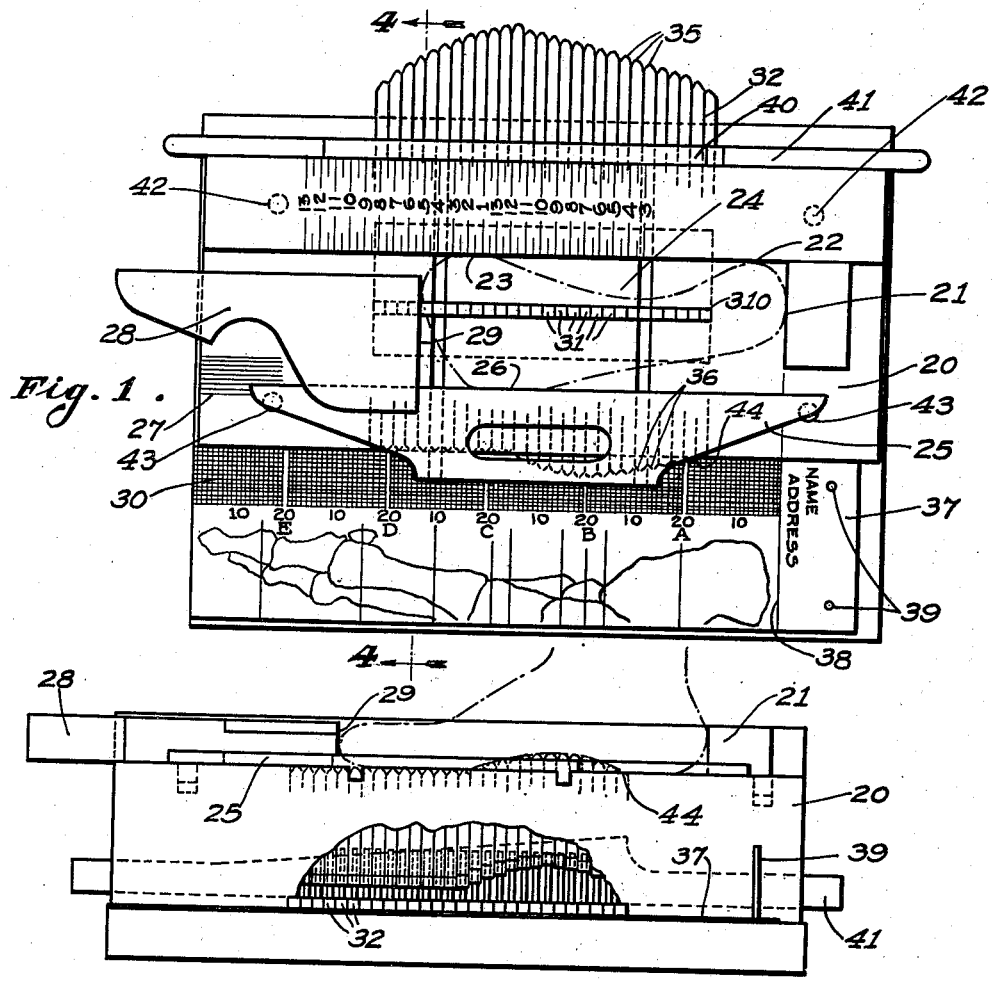
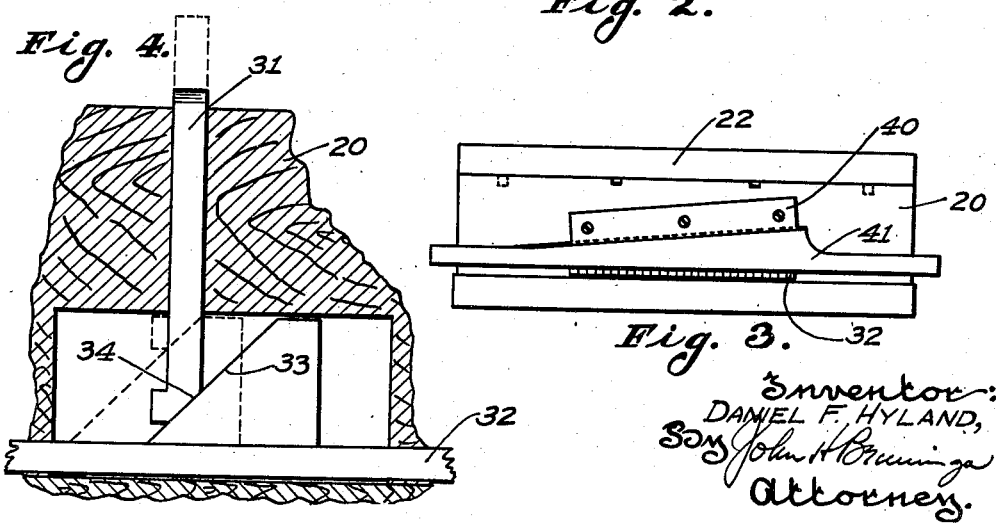
Inventor:
DANIEL F. HYLAND,
By John H. Bruninga
Attorney.

Patented June 20, 1939

2,162,916

UNITED STATES PATENT OFFICE 2,162,916

ORTHOPEDICS

Daniel F. Hyland, St. Louis, Mo.

Application October 7, 1935, Serial No. 43,817

10 Claims. (Cl. 33—3)

This invention relates generally to orthopedics and particularly to process and apparatus for measuring the arches of feet, in order to ascertain the proper size and shape of lifts and to properly locate the same in shoes.

The object of the present invention, generally stated, is to provide a process and apparatus for measuring the arches of feet in order to ascertain the size and shape of a lift appropriate to the case.

A further object of this invention is to provide an apparatus for measuring the arch of a foot.

A more specific object of this invention is to provide an apparatus for measuring the length, width and arch height of feet for determining the size and shape of shoes and lifts to be used therein, together with apparatus and shoes so constructed and arranged that appropriate lifts may be readily positioned therein in proper location according to the foot measurements.

Other objects will become apparent to those skilled in the art, when the following description is read in connection with the accompanying drawing, in which:

Figure 1 is a plan view of an apparatus for measuring the length, width and arch height of feet in accordance with the present invention.

Figure 2 is a view in side elevation of the device shown in Figure 1, part being broken away to reveal the relation of parts.

Figure 3 is a detail view of the locating device for the apparatus of Figures 1 and 2.

Figure 4 is a part sectional view taken along line 4—4 of Figure 1 and illustrating particularly the elevating means for the arch measuring elements of the device illustrated in Figure 1.

Generally stated, in accordance with the present invention, the arch of a foot is measured in order to determine the height thereof at various distances from the remotest point of the heel. This arch height determination may be accomplished by suitable measuring means such, for instance, as that hereinafter described, by which the contour and elevation of the arch may be readily ascertained, as well as the distance at various points from any selected point on the foot such, for instance, as the heel terminus. Having measured the height of the arch in this manner, a lift or arch support suitably sized and shaped in accordance with the measurements made may be selected and so positioned in a shoe to be used upon the foot measured that a selected point thereon such, for instance, as the rearmost point thereof, is at that distance from the interior back portion of the shoe which the recession point of arch of the foot is from the heel terminus. It will be understood, of course, that for fitting lifts or arch supports to some sections of the foot, as, for instance, to support the scaphoid and cuneiform bones, the distance of the highest point of the arch from the heel may determine the location of the support in the shoe. The present invention contemplates, therefore, apparatus for measuring the height of the arch at various points, in order that an appropriate lift or arch support may be placed in a shoe in accordance with the measurements made upon the foot.

In order to accomplish measurement of the arch so as to determine the positions where displacement has occurred and the position in which adjustment is to be accomplished, a measuring device such as that illustrated in Figures 1 to 4 inclusive may be employed.

Such a device may comprise a foot rest 20 having a heel abutment 21 providing a flat surface against which the posterior portion of the heel may be placed. A longitudinal abutment 22 may also be provided and in accordance with the embodiment illustrated, the heel abutment 21 abuts longitudinal abutment 22 so as to provide an angle into which the heel may be placed with the inside thereof against longitudinal abutment 22 and the posterior terminus against heel abutment 21. The interior ball portion of the foot may be moved into contact with the longitudinal abutment as shown at 23, and when a normal foot is in this position a substantial space will remain between the arch portion of the foot and longitudinal abutment 22, as shown at 24. In cases of pronation, however, the space 24 will be reduced according to the degree of the affliction, in some cases the foot contacting with the longitudinal abutment from heel to ball.

With the foot in the position illustrated by the broken lines in Figure 1, the length, width and arch height at various distances from heel abutment 21 may then be measured. In order to accomplish the width measurement, a slide 25 may be provided. As shown in the drawing, slide 25 is arranged to provide a straight edge portion 26 for engaging the exterior ball portion of the foot and a scale 27 is provided for indicating the distance between straight edge portion 26 of slide 25 and longitudinal abutment 22, hence to indicate the width of the foot embraced by these members.

In order to measure the length of the foot, an abutment 28 may be provided. Such an abutment 28 may be freely movable with reference to the other parts and may have a straight edge portion 29 arranged to be perpendicular to longitudinal abutment 22. A suitable scale may be provided as, for instance, on a chart 30 for indicating the distance between straight edge 29 and heel abutment 21, hence the length of the foot.

Now, in order to measure the height of the arch at various points throughout its length a series of feelers 31 may be arranged to extend upwardly through a slot 310 in foot rest 20. Means may be provided for elevating the respective feelers 31 to a position such that they contact with the arch of a foot resting upon foot rest 20. Such a means may comprise a series of bars 32, one for each feeler 31 and each provided with an inclined camming member 33 for cooperating with a similarly inclined cam surface 34 on the bottom of the respective feelers, as clearly shown in Figure 4. Now when bar 32 is moved to the left as shown in Figure 4 from the full line position to the dotted line position, it will be apparent that feeler 31 is raised from the full line position to the dotted line position.

Any number of such feelers 31 with their cooperating parts may be provided, and advantageous arrangement being one such feeler to each one-eighth or quarter inch.

When camming surfaces 33 and 34 extend at an angle of 45° as shown, the respective feelers 31 will readily respond and move into conformity with the arch whether the force is applied by the foot thereabove or manually to bars 32.

In accordance with the embodiment illustrated in the drawing, bars 32 may be arranged so as to extend for a substantial distance beyond the edge of the device, as shown at 35, in order to conveniently operate them. The bars 32, however, when feelers 31 are all in line terminate in line at their other ends 36. When, however, some of the feelers are elevated, as shown in Figures 1 and 2, the corresponding bars 32 will extend out of alinement to the same extent as the elevation of the corresponding feelers (when the inclination of camming surfaces 33 aand 34 is at 45°). The extension of ends 36 to the same extent as the elevation of feelers 31, therefore, provides a templet clearly indicating the height of the arch at various distances from the heel.

In accordance with the present invention, a chart 37 having a base line 38 in alinement with heel abutment 21, as shown, may be suitably located on the device through pins 39 and arranged to underlie the extends ends 36 of bars 32. When the parts are in this position, therefore, a pencil may be drawn about the extending ends 36 of bars 32 so as to trace the shape of the arch upon chart 37 and thereby indicate the height thereof at various distances from base line 38.

The chart 37 may be graduated in suitable units and hence by tracing the arch on the chart and reading the distance between the active point (such as the highest point) and base line 38 the proper location of the lift in a shoe is indicated. The tracing also gives an accurate reproduction of the arch for the use in custom building lifts.

When tracing the shape of the arch upon chart 37, it is desirable that bars 32 be locked in position and this may be accomplished by any suitable locating mechanism. As illustrating a suitable locating mechanism, the edge of foot rest 20 may be provided with an angularly extending bar 40 spaced above bars 32. A suitable wedge 41 having one surface inclined at the same degree as bar 40 and the other surface parallel to the upper surfaces of bars 32, may be wedged between bars 32 and 40 as clearly shown in Figure 3 so as to locate bars 32 in position.

The device of the present invention, as illustrated in Figures 1 and 2, is arranged so as to measure the left foot, but when it is desired to measure the right foot, the arrangement of the parts may be reversed. In order to permit this, longitudinal abutment 22 may be removably mounted upon foot rest 20 as by a pair of pins 42 arranged to fit into corresponding openings in foot rest 20. A similar pair of corresponding openings 43 may be provided on the opposite side of the device so that longitudinal abutment 22 may be lifted from one side to the other. Similarly slide 25 may be changed from one side to the other of the device.

In cases where the foot distortion has proceeded to such an extent that specially built lifts are required, it is of advantage to employ a measuring device wherein feelers corresponding to feelers 31 of the embodiment just described are provided entirely across the plantar of the foot. By elevating each of the series of feelers in such arrangement until contact is made with the arch, it is apparent that not only is the longitudinal curvature measured but also the transverse curvature. In order to facilitate the manufacture of such specially constructed lifts, it is advantageous to lock the respective feelers in position in a suitable carrying bar so that the assembly with the feelers locked in the position which they occupied when the arch was measured be transported to the lift manufacturer who may then reproduce the contour thereof.

In proceeding to measure an arch of a foot in accordance with the present invention, the foot may be placed upon the device with the feelers 31 in lowered position. In order to ascertain the shape of the arch under normal conditions, it is desirable that the foot be simply rested upon foot rest 20 at this time—that is to say, with the weight of the body off. Bars 32 may then be moved by manipulation of ends 35 to elevate the respective feelers until they exert a uniform slight pressure upon the arch of the foot, care being taken to manipulate each of bars 32 in order to assure a correct representation of the curvature of the arch. When each of the bars has been moved to its limit, as stated, they may be locked in position by a wedge 41 and the shape of the arch as represented by the ends of the extensions 36 inscribed upon the chart 37.

In cases of pronation, as pointed out above, the space 24 is reduced and the extent of the reduction indicates the extent of the trouble. In such a case the foot may be placed against the longitudinal abutment 22, as indicated in Figure 1, and the arch lifted until the space 24 is restored as completely as possible. The feelers may now be operated and the resulting measurement will give the normal height of the arch to which the foot must be corrected. Where feelers are provided entirely across the plantar area, a three-dimensional measurement of the arch may be obtained. It has been found advantageous to take two or more such measurements, one of the normal arch as just described, and others with a greater or less portion of the weight of the body placed upon the foot. From such measurements lifts may be made to correct the pronation.

With this representation of the normal shape of the arch, an appropriately sized and shaped lift may be made or selected. The lift may then be placed beneath the foot on the device and the weight of the body placed upon the foot in order to assure that the selected lift is appropriately sized and shaped to give comfort to the individual. After this check is made, the lift may then be placed in the shoe with a selected point thereon, at the distance from the interior back portion of the shoe which the recession point measures from base line 38 on chart 37.

It is obvious that various changes may be made in the details of construction or procedure, within the scope of the appended claims, without departing from the spirit of this invention; it is understood, therefore, that the invention is not limited to the specific details shown and described.

Having thus described the invention, what is claimed is:

1. Apparatus for measuring the arches of feet comprising, a foot rest having a heel abutment, a series of feelers extending longitudinally of said rest and movable normal to the surface of said rest into contact with the arch of the foot, and means moving at an angle thereto for indicating the elevation of said feelers having the indicating portion thereof blunted adapted for passing a marker thereover to transcribe the indication.

2. In an apparatus for measuring feet, a foot rest having a heel abutment, a series of feelers movable to project the same upwardly from said foot rest, a series of indicators movable horizontally, and means limiting the movement of said indicators to correspond with that of said feelers respectively.

3. In an apparatus for measuring feet, a foot rest having a heel abutment, a series of feelers movable to project the same upwardly from said foot rest, a series of manipulating elements for operating said feelers, a series of indicators movable horizontally by operation of said manipulating elements, and means limiting the movement of said indicators to correspond with that of said feelers respectively.

4. In an apparatus for measuring feet, a foot rest having a heel abutment, a series of feelers movable to project the same upwardly from said foot rest, a series of indicators movable horizontally, and means limiting the movement of said indicators to correspond with that of said feelers respectively, said indicators extending laterally for cooperation with a chart in order to transfer their indication to the chart.

5. In an apparatus for measuring feet, a foot rest having a heel abutment, a series of feelers movable to project the same upwardly from said foot rest, a series of indicators movable horizontally, means limiting the movement of said indicators to correspond with that of said feelers respectively, and a table adjacent said indicators adapted to receive a chart for recording their indications.

6. In an apparatus for measuring feet, a foot rest having a heel abutment, a series of feelers movable to project the same upwardly from said foot rest, and an abutment extending longitudinally of said series of feelers for positioning the foot relatively thereto.

7. In an apparatus for measuring feet, a foot rest, a series of feelers mounted in said rest for movement relative to the surface thereof, and a longitudinal foot abutment extending over said rest lengthwise of the foot when positioned thereon, for engagement by the inside surface of the foot in order to position the foot on said rest in arch-correcting position for measurement by said feelers.

8. In an apparatus for measuring feet, a foot rest, a series of feelers mounted in and arranged along said rest for movement relative to the surface thereof, and a longitudinal foot abutment extending over said rest, alongside of said feelers and lengthwise of the foot when positioned thereon, for engagement by the inside surface of the foot in order to position the foot on said rest in arch-correcting position for measurement by said feelers.

9. In an apparatus for measuring feet, a series of movable feelers mounted for relative displacement to simultaneously engage different points of the sole of a foot to be measured, a series of indicators in cooperative relation with said feelers so as to be displaceable in a reclining plane respectively in accordance with the movements of said feelers, said feelers having guide portions engageable by a marker while the foot is in engagement with said feelers in order to transcribe the shape of the plantar surface of the foot engaged by said feelers.

10. An orthopedic apparatus, comprising, a support, a series of movable feelers mounted on said support for relative displacement to simultaneously engage different parts of the sole of a foot, means cooperating with and displaceable in accordance with said respective feelers adapted to set up a contour corresponding to that of the sole, and means for positioning a record with respect to said contour, the contour and the record being adapted to permit recording of the contour on the record, and said record positioning means being adapted to permit replacement of the record with reference to the contour while the foot remains in engagement with the feelers.

DANIEL F. HYLAND.